July 16, 1963 C. L. ROUGH 3,097,371
FOLDING BOAT
Filed Oct. 4, 1960 2 Sheets-Sheet 1

INVENTOR.
CHARLES L. ROUGH
BY
ATTORNEY.

July 16, 1963  C. L. ROUGH  3,097,371
FOLDING BOAT
Filed Oct. 4, 1960  2 Sheets-Sheet 2
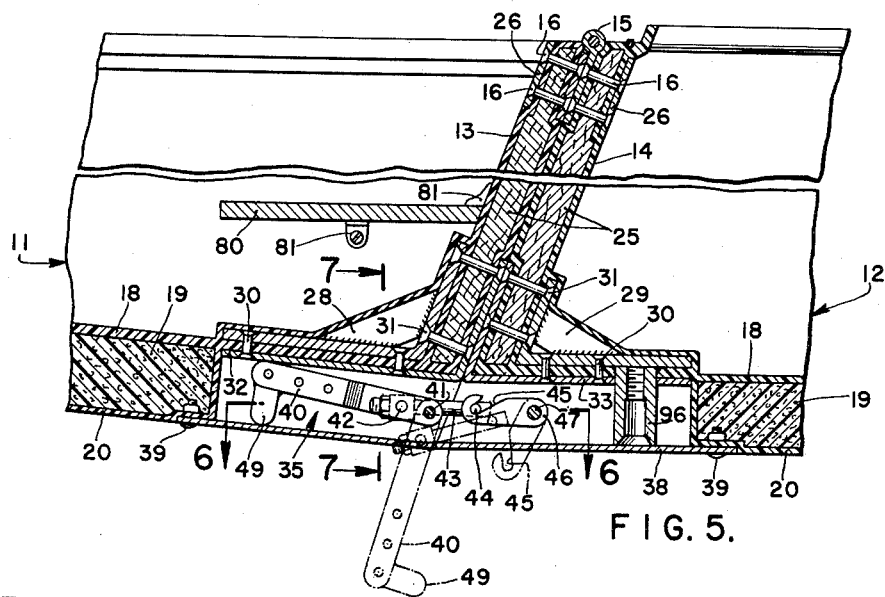
FIG. 5.
FIG. 4.
FIG. 6.
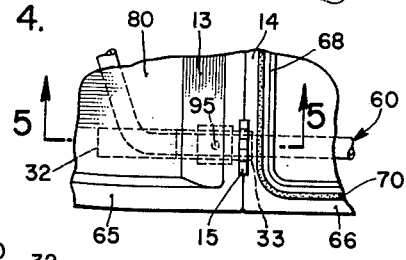
FIG. 7.
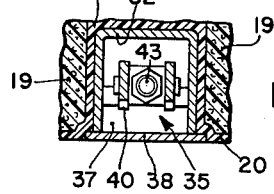
FIG. 8.
FIG. 9.
INVENTOR.
CHARLES L. ROUGH
BY 
ATTORNEY.

United States Patent Office 3,097,371
Patented July 16, 1963

3,097,371
FOLDING BOAT
Charles L. Rough, 3511 Burritt Way, La Crescenta, Calif.
Filed Oct. 4, 1960, Ser. No. 60,499
14 Claims. (Cl. 9—1)

This invention relates to small boats and more particularly to a novel and improved boat formed principally of reinforced plastic material and adapted to fold into a compact neat appearing cargo carrier for securement to a two-wheeled trailer while being towed along highways behind a motor vehicle.

The great popularity of small boats is handicapped by the fact that many apartment and small home owners have cramped and limited storage facilities for a boat and its trailer. To meet these problems there have been proposed heretofore numerous folding boat constructions adapted to be hauled behind a passenger vehicle. These proposals have been sufficiently meritorious to stimulate considerable interest by boat enthusiasts.

However, the constructions heretofore proposed to this end are subject to certain disadvantages and shortcomings sought to be overcome by the present invention. For example, most proposals have given slight attention to structural details of the folding boat hull structure itself and to the creation of design features rendering the boat hull weather-tight and reliable for use as a cargo storage chamber or to the provision of a rugged boat hull of pleasing appearance and exhibiting maximum hydrofoil characteristics.

Another factor which has received inadequate attention in prior designs has been a folding boat construction capable of being produced at reasonable cost yet one taking maximum advantage of the strength of inexpensive constituent materials, as well as one requiring a minimum of servicing, upkeep and maintenance by the owner. Not only is it essential that the boat structure itself have excellent handling and maneuverability characteristics but it must also be unsinkable, easily handled in and out of the water, safe from overturning, weather-tight when folded, and provide maximum storage capacity for luggage and other gear normally required for camping and recreational purposes.

The present invention satisfies these needs to an unusual degree and incorporates important improvements over any construction heretofore proposed. The boat hull is designed to be formed from multiple layers or coatings of fiberglass reinforced plastic applied over a female mold form by known plastic spray gun technique. The hull as a whole is formed in two complemental halves adapted to be hinged together crosswise of the midportion of the hull and having their rim edges shaped to nest in a manner providing a weather-tight storage compartment. Both the transverse partitions across the adjacent ends of the two halves as well as the transom of the rear half are intimately and integrally joined to the outer plastic shell of the hull and the reinforcements for these partitions, as well as other reinforcing brackets and fittings, are embedded in the plastic material forming the hull.

Another feature of importance is the provision of a double compartment bottom for each half containing buoyant material rendering the entire hull unsinkable and cooperating with enclosing thin layers of plastic to strengthen and support the latter.

The partitions crosswise of the adjacent ends of the hull halves are inclined upwardly and rearwardly thereby providing numerous advantages including neater appearance, greater strength, a back rest for a passenger seat and other purposes as will become evident from the drawings and the detailed description of the boat. Additionally, the upper peripheral edge of the rear half includes a continuous integral flange designed to nest within the interior rim of the front hull half and cooperating with a continuous strip of resilient gasket material to provide a fluid-tight joint in the closed folded position of the boat halves. This feature is of considerable importance and safeguards against the possibility of water being forced into the interior of the hull by wind and by the like pressures likely to prevail while the boat is being hauled behind vehicles. Likewise, there is no possibility of water seeping into the interior of the boat while stored for long periods of time out-of-doors.

Another feature includes a fast-action latch mechanism for locking the boat in its extended open position with all parts of the latch concealed within the exterior surface of the hull thereby avoiding the possibility of damage to this mechanism in the use and handling of the boat. A cover plate for the latch compartment lies flush with the underside of the boat hull and prevents the mechanism from becoming fouled with sand, seaweed and other growth and also safeguards against unexpected and accidental opening of the latch. Other hardware includes a key-operated latch built into the mating rims of the two halves and preventing unauthorized persons from gaining access to items stored within the hull.

It is also pointed out and emphasized that the bow portion of the hull is specially contoured to achieve maximum efficiency as a hull while providing an upper rim edge across the bow which is unusually broad transversely of the boat and which cooperates with the specially contoured aft end of the hull rim to form a weather-tight seal therewith.

These and other more specific objects will appear upon reading the following specification and claims and upon considering in connection therewith the attached drawings to which they relate.

Referring now to the drawings in which a preferred embodiment of the invention is illustrated.

FIGURE 4 is an enlarged fragmentary detail plan view taken through one corner of the hinge connection between the hull halves while mounted on the trailer and with the boat in open position;

FIGURE 5 is a fragmentary vertical sectional view on enlarged scale taken along line 5—5 on FIGURE 4 showing constructional details and features of the fast-action latching mechanism;

FIGURE 6 is a fragmentary view on a slightly reduced scale taken along line 6—6 on FIGURE 5;

FIGURE 7 is a transverse sectional view through the latch mechanism taken along line 7—7 on FIGURE 5;

FIGURE 8 is a fragmentary vertical sectional view on an enlarged scale showing means for clamping the boat to the trailer and taken along line 8—8 on FIGURE 1; and FIGURE 9 is a fragmentary sectional view on an enlarged scale taken along line 9—9 on FIGURE 2 and showing the nesting rims of the hull halves when folded.

Figure 1:
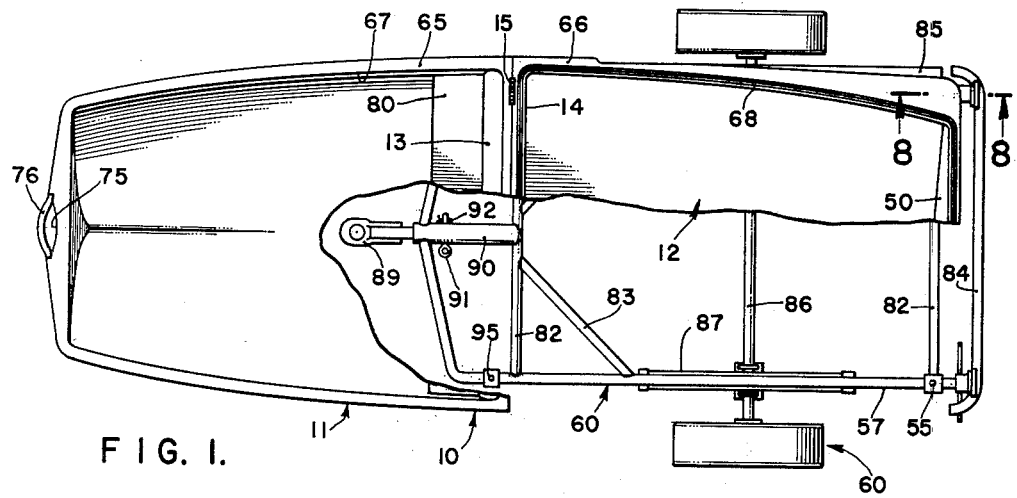
FIGURE 1 is a top plan view of a boat hull according to this invention and shown in open position while mounted on a hauling trailer, portions of the hull being broken away to show details of the trailer construction.
Figure 2:
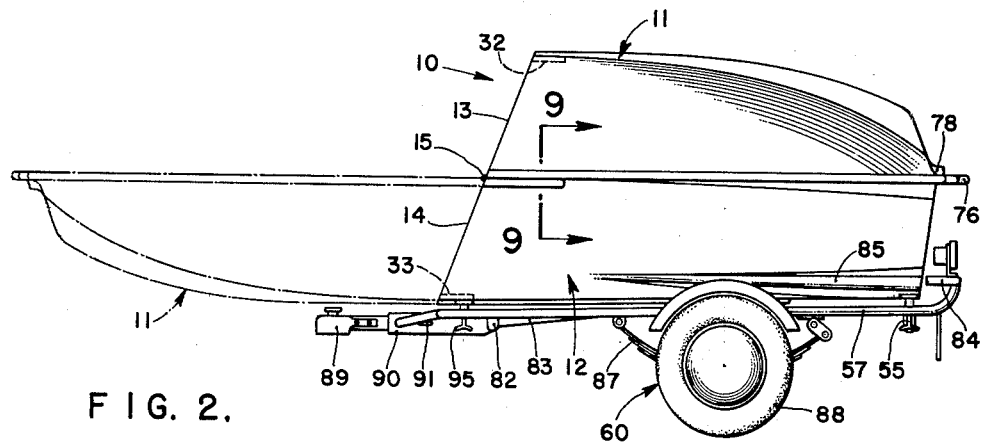
FIGURE 2 is a side elevational view showing the boat hull folded together and including a dot-and-dash line showing of the bow end in open position.
Figure 3:
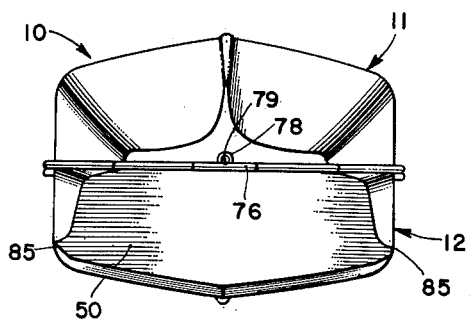
FIGURE 3 is a rear end view of the boat hull per se in closed position.

Referring more particularly to FIGURES 1 to 3, there is shown a preferred embodiment of a folding boat incorporating the features of the present invention and designated generally 10. The boat hull is formed by two one-piece molded plastic shells comprising a bow section 11 and an aft section 12 each having extending transversely across their adjacent ends a flat partition 13 and 14, respectively. The upper edges of these partitions are hingedly connected together by suitable hinges 15, the leaves of which are rigidly secured to the partitions by screws 16. It will be understood that hinges 15 may be of the piano type and extend the full width of the boat hull.

It is pointed out and emphasized that each half 11 and 12 of the boat hull is formed principally of plastic reinforced throughout with short length of fiberglass and additionally by other brackets and reinforcing members to be described in detail presently. Certain of the structural details are best shown in FIGURES 4 through 9. From these it will be understood that the entire bottom of each half is relatively thick and comprises an inner layer of plastic 18, a relatively thick intermediate layer of lightweight buoyant material, as styrofoam plastic 19, and an outer layer of reinforced plastic 20 all intimately bonded together throughout their contacting surfaces and integral with the remaining portions of the main body of each hull section 11 and 12. The described laminated structure of the bottom not only provides a non-sinkable hull structure but a unitary laminated bottom formed entirely of plastic constituents and admixed reinforcing having sufficient strength for all operating requirements without need for the usual framing and reinforcing ribs common to prior boat structures.

Partitions 13 and 14 forming the adjacent ends of the two hull halves 11 and 12 are shown in FIGURE 5. Each is rigidly reinforced by an interior core of rigid sheet material 25 as selected high-strength plywood or other high-strength lightweight material. All exterior surfaces of material 25 are coated with the plastic material constituting the side walls and the bottom of the boat sections. In consequence of this integral construction, no moisture can reach sheeting 25. Further the layer of plastic material adheres strongly to the surface of the sheets thereby adding materially to the strength and rigidity of the partitions.

As is best shown in FIGURE 5, the leaves of hinges 15 are secured to partitions 13 and 14 by the rivets 16 the outer ends of which pass through bearing plates 26 of brass or the like non-corrosive material having their surfaces lying flush with the plastic material.

Strengthening and reinforcing the junction of the partitions with the bottom of the boat are a plurality of pairs of generally similar metal brackets 28, 29 held assembled to the hull by rivets or brass screws 30 and 31. The outer ends of these rivets preferably pass through and anchor in place exterior metal brackets 32 and 33. The horizontal portions of the latter brackets are of inverted U-shape in cross-section, as is best shown in FIGURE 7, and provide anchorages for the fast-action clamping devices designated 35 and employed to hold the hull sections 11 and 12 locked in open position.

At least two pairs of latch mechanisms 35 are provided and housed within the elongated recesses 37 provided by the inverted U-shaped portions of brackets 32, 33. These recesses open downwardly through the bottom surface of the hull sections and are normally closed by a cover plate 38 held in place by suitable fast-action fasteners 39 of the type engaged and released by a quarter-turn of the screw proper.

Details of clamping devices 35 are best illustrated in FIGURES 5 and 6 and include a manually operated toggle lever 40 provided with trunnions 41 projecting from its exterior sides and journaled in the side walls of bracket 32. Pivotally journaled between the bifurcated legs of lever 40 on trunnions 42 is a threaded T-bolt 43 having its head 44 engageable in notches 45 formed in a detent link 46. The latter is pivotally supported by a pin 47 between the sides of the U-shaped portion of bracket 33. As is made clear by the drawing, T-bolt 43 has a threaded shank adjustable crosswise of trunnions 42, and as required for the proper functioning of the latch to lock the boat sections snugly in open position.

An extension 49 projecting downwardly from the underside of operating lever 40 engages the inner side of cover plate 38 and safeguards against the possibility of the toggle latch opening so long as the cover plate is in closed position. When the latch is closed, trunnions 41 are located past dead center and below a line drawn through pins 42, 44 and 47 in which position the latch cannot move to open position without the application of a downward pull on the outer end of operating lever 40.

Referring now to FIGURE 8, showing construction details of the boat transom 50 and its junction with the laminated bottom of aft section 12, it is pointed out that the transom is constructed similarly to partitions 13 and 14. Its core 51 comprises high-strength lightweight sheeting of impregnated plywood or the like all surfaces of which are embedded in the plastic constituting the body of the aft hull sections. To be noted from FIGURE 3 in particular is the fact that the merger of the opposite end corners of the transom with the side walls of the hull is along lines which converge inwardly and upwardly to conform with the similar inclination of the hull side walls in the rear upper portion thereof. Additionally, reinforcing the junction of the transom with the boat bottom are bracket members 53 of metal encased in plastic material and having a threaded opening extending downwardly through the bottom of the boat to receive a T-shaped clamping bolt 55. Bolt 55 is rotatably supported in a thimble 56 welded or otherwise secured vertically at the rear corner of the tubular framework 57 of trailer 60. Secured to the upper end of thimble 56, as by welding, is a pad 58 topped by a rubber bumper 59 against which the bottom of the boat section is clamped by the clamping bolt 55. The lower end of the stem of T-bolt 55 has a wide annular groove 62 cooperating with the bifurcated end of a keeper strip 63 to retain the T-bolt assembled to the trailer frame while leaving it free to rotate.

Referring now to FIGURE 9 it is pointed out sections 11 and 12 of the boat hull each terminate in horizontally disposed reinforcing lips 65, 66, respectively, so designed and contoured as to nest against one another in the folded condition of the boat hull. The rim of the bow section 11 is turned inwardly as indicated at 67 and its inner side wall is sized to nest easily about the outer side wall of an upwardly extending continuous flange 68 encircling the inner rim of lip 66 of aft section 12. Of considerable importance to the weather-tightness of the folded hull is the fact that the endless vertical flange 68 extends about the entire inner peripheral edge of lip 66 without a break.

Cooperating with nesting flanges 67, 68 integral with the rim areas of the boat sections is an endless resilient gasket 70 adhesively or otherwise firmly secured in a retainer groove 71 formed in the horizontal surface of lip 66 and spaced closely outside the base end of flange 68. Accordingly, the protruding upper edge of gasket 70 is positioned to engage the outer surface of lip 65 of the forward bow section and to provide a fluid-tight seal safeguarding against the possibility of moisture, wind or other fluid entering the cargo space of the boat when snugly folded.

The forward rim edge of section 11 has a cut-out 75 bridged by a brass handgrip 76 useful in the handling of the boat and in securing it to a wharf or other anchorage. Closely associated with and underlying handgrip 76 is a tubular housing 78 for a key-operated lock mechanism 79 housed within the plastic hull and the detent of which interlocks with keeper means rigidly secured to the juxtaposed portion of aft section 12. Lock 79 will be understood as movable between open and closed positions by a suitable key to lock and unlock the boat sections.

Referring now to FIGURE 5 it will be understood bow section 11 is preferably provided with a passenger seat 80 immediately forward of partition wall 13 and secured thereto and to the hull, as by brackets 81. The upper portion of partition 13 will therefore be recognized as providing a comfortable upwardly and backwardly inclined back rest for seat 80. As will be appreciated, the upwardly and backwardly inclined dispositions of partitions 13 and 14 greatly strengthen the rigidity and sturdiness of the hull. In addition, and of importance, is the fact that this arrangement of partitions 13 and 14 provides a closed cargo carrier having a front end wall inclined acutely to the vertical and adding appreciably to the appearance of the folded hull.

Trailer carriage 60 comprises a tubular framework having longitudinal side members 57 interconnected by cross members 82 and suitable tie braces 83. The rearmost ends of frame members 57 are turned upwardly, as is best shown in FIGURE 2, and support a bumper member 84 the ends of which are aligned with the horizontally disposed reinforcing and stabilizing ribs 85 along the lower rear side walls of aft section 12. The described trailer framework is supported on an axle 86 through suitable leaf springs 87 and supporting pneumatic tired wheels 88.

The forward end of the trailer is provided with a draw bar 89 adjustable telescopically within tube 90 rigidly secured to the forward edge of the trailer frame. The draw bar is held in any desired adjusted position lengthwise of tube 90 by a pin 91 held in place by a cotter key 92. The outer end of the draw bar is preferably provided with any suitable swiveling hitch for connecting the same to a mating hitch fitting carried by the hauling vehicle.

Of importance is the fact that draw bar 89 and the attached hitch coupling are spaced well below the bottom of bow section 11 should the latter be pivoted to its fully opened position indicated in dot-and-dash line in FIGURE 2 while the rear hull section remains rigidly attached to the trailer frame. Except for this safeguard and design feature, opening of the boat might result in puncturing the hull by contact with the trailer coupling.

Both forward corners of the aft section of the hull are rigidly securable to the trailer by means of T-bolt clamps 95 (FIGURE 2) carried by the trailer frame similarly to that described for rear clamps 55 shown in FIGURE 8. In this connection it is pointed out that the threaded shanks of clamps 95 engage in the threaded bores of thimbles 96 brazed or otherwise rigidly anchored to brackets 29, 33.

Brief reference will also be made to the technique employed in fabricating the described boat hull. Costly mating molds and press equipment are not required but instead only a pair of female mold members conforming to the desired exterior shape of each section 11, 12. These are suitably treated with a mold release agent to prevent sticking of the plastic to their outer surfaces. A layer of semifluid plastic is then sprayed onto these surfaces by a specially designed known spray gun as short lengths of fiber glass are added in random fashion. The viscous plastic material is carefully spread and rolled into a layer of uniform thickness whereupon brass fittings 28 and 29 are suitably applied to the surface of the plastic coating following which additional quantities of plastic spray and fiber glass are applied. Thereafter a layer of preformed buoyant material such as styrofoam is applied over the bottom surfaces of the hull.

An outer layer of plastic is then applied about all exterior surfaces of the buoyant material. Core sections 25 of partitions 13 and 14, as well as core section 51 of transom 50, are applied against the molten plastic, desirably after all surfaces are suitably moistened, as additional plastic is sprayed and rolled into firm adherence with all surfaces of these cores. It is also pointed out that bracket members 32, 33 are applied during this period as are any other desired fittings and hardware. After all plastic surfaces of the hull have been built up to desired thicknesses and uniformly rolled and pressed into shape, the plastic is subjected to curing in accordance with techniques and conditions well known to those skilled in the plastic arts.

While the particular folding boat herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a folding boat formed in two halves hingedly connected together transversely of the mid-portion of the boat; that improvement which comprises a pair of transverse partition means each integral with an associated half of said boat and each similarly inclined acutely to a vertical plane and in a direction toward the aft end of the boat whereby the upper portion of the partition means for the bow half of the boat provides a comfortable inclined back rest for a seat, and whereby said pair of partition means cooperate in the folded position of the boat to provide a closed cargo compartment the forward end of which presents a neat-appearing upwardly and rearwardly inclined flat wall, the bow half of said boat being substantially as wide as the rear end of the stern half and being inclined upwardly and forwardly into merger with a generally wide long straight horizontal lip extending across the forward end of said bow half, said bow half having a downwardly projecting keel-like rib extending lengthwise centrally of said half, the stern half of said boat having a bottom including shallow V-shaped panels and a planar transom extending crosswise of said boat and merging along its lower edge with said shallow V-shaped panels forming the bottom of said stern half.

2. A folding boat as defined in claim 1 characterized in that the main body of said boat halves are each of one-piece reinforced plastic construction and in that said partition means includes a non-plastic core of high-strength sheet material fully encased by said reinforced plastic material constituting the main body of said boat halves.

3. A folding boat as defined in claim 1 characterized in that the main body of each boat half includes a bottom portion of laminated construction having a sealed internal core of high strength material having a specific gravity substantially less than water, the surfaces of said core being in direct supporting contact with the integral one-piece fluid-tight reinforced plastic material constituting the main bodies of said boat halves.

4. A folding boat as defined in claim 1 characterized in that the rear half of said boat has an upstanding endless flange integral with and spaced inwardly from the upper periphery thereof, said endless flange being nestable against the peripheral rim of the forward half of said boat in the fully folded position thereof and cooperating therewith to provide a weather-tight junction along the entire mating rims of said boat halves.

5. A folding boat as defined in claim 4 characterized in that one upper rim edge of one of said boat halves has secured thereto an endless resilient gasket positioned to engage the rim of the other boat half as the same are folded together.

6. A folding boat as defined in claim 4 characterized in that the rear half of said boat has a continuous upwardly opening channel spaced closely beside the exterior base edge of said endless flange, and a resilient sealing gasket seated in and secured to said channel with its upper portion projecting upwardly beyond the inlet opening to said channel.

7. A folding boat as defined in claim 1 characterized in the provision of lever-operated toggle latch means movably supported in channel means opening outwardly through the exterior surfaces of said boat halves and intercepted by the junction of said halves in the fully opened positions thereof, said toggle latch means being interengageable with said halves to lock the same releasably and rigidly in open position.

8. A folding boat as defined in claim 7 characterized in the provision of cover means normally closing the channel means when said latch means is engaged to lock said boat halves together in the unfolded positions thereof to form an open boat and lying substantially flush with the exterior surfaces of said boat halves thereby to protect and conceal said toggle latch means and to exclude foreign matter therefrom.

9. A folding boat as defined in claim 8 characterized in that the closure of said cover means following the closing of said toggle latch means is effective to prevent said toggle latch means from opening until said cover means is removed, and means for detachably securing said cover means in place across said channel means.

10. A folding boat hull comprising a pair of unitary molded shells cooperable to provide a streamlined hull divided transversely of its mid-length by a pair of rearwardly inclined partitions hinged together along their upper edges cooperating when said shells are unfolded to provide a rearwardly inclined back rest for a seat extending crosswise of the forward shell between the upper and lower edges of said partitions, the rear half of said hull having inwardly and upwardly converging side walls terminating in a continuous vertical flange merging on the exterior side of its base with a planar lip, said lip and vertical flange being shaped to nest within the interior peripheral rim edge of the bow half of said hull in the folded position of the latter to provide a weather-tight cargo carrier adapted to be hauled on a wheeled chassis behind a motor vehicle.

11. A folding boat hull as defined in claim 10 characterized in that said rear half includes connector fittings molded into the lower corners thereof and facing downwardly to receive mating clamping means carried by said wheeled chassis and by which said boat hull can be rigidly but detachably clamped to said chassis.

12. A folding boat hull as defined in claim 10 characterized in that the rim edges of said halves have embedded and built thereinto a key-operated lock and catch mechanism and having different interengageable parts thereof located in the respective remote ends of said hull and mateable between the edges of the hull halves in the folded condition of said halves to lock said halves rigidly closed together.

13. A folding boat hull comprising a pair of unitary shells each of one-piece reinforced plastic construction, said shells including differently contoured bow and stern shells each having similar flat transverse partitions at their adjacent ends in the mid-portion of the hull, means hingedly connecting said partitions together along their upper edges, fast-action toggle clamp means located within downwardly opening indentations formed in the bottom of said hull and operable from the exterior underside of said shells for locking the latter in their unfolded boat-forming positions, the forward lower portion of the bow shell being inclined upwardly and forwardly through the major length thereof and having a downwardly projecting long narrow keel-like rib which is relatively deep at its forward end and relatively shallow vertically at its rear end, the upper front rim edge of said bow shell being substantially as long as the corresponding lip extending crosswise of the rear end of the stern shell and lying parallel to one another and normal to the longitudinal axis of said boat hull, said lips being nestable in the endless complementally-shaped upstanding rim edge of the rear shell of said hull thereby to provide when closed a large capacity weathertight cargo chamber adapted to store luggage and the like while the boat is being hauled on the highway.

14. In a boat hull made in two one-piece plastic halves one of which is shaped suitably to form the bow of the boat and the other is shaped suitably to form the aft portion of the boat and including transverse partition means across the adjacent ends of said halves for hingedly holding the same assembled; that improvement in the aft half of said hull which includes a pair of high-strength sheets of reinforcing material embedded within the plastic material forming the body proper of said boat hull, one of said sheets being located at the front end of said aft half and the other being located at the rear end thereof to form a transom for said boat, and a plurality of reinforcing brackets embedded in said plastic interiorly of and adjacent the opposite ends of said aft half and at the intersections of said partition and of said transom with the bottom of said hull, said brackets serving to reinforce and strengthen said hull and including means engageable therewith from the underside of said aft half for clamping said boat hull rigidly to a trailer chassis.

References Cited in the file of this patent

UNITED STATES PATENTS

| | | |
|---|---|---|
| 1,148,961 | Ellison | Aug. 3, 1915 |
| 1,560,983 | Gibbs et al. | Nov. 10, 1925 |
| 2,157,186 | Pinter et al. | May 9, 1939 |
| 2,266,661 | Smith | Dec. 16, 1941 |
| 2,743,465 | Vogel | May 1, 1956 |
| 2,773,755 | Larsen | Dec. 11, 1956 |
| 2,815,309 | De Canahl et al. | Dec. 3, 1957 |
| 2,829,385 | Keith | Apr. 8, 1958 |
| 2,833,682 | De Laszlo | May 6, 1958 |
| 2,945,468 | Payne | July 19, 1960 |
| 2,980,924 | Canazzi | Apr. 25, 1961 |

FOREIGN PATENTS

| | | |
|---|---|---|
| 28,809 | Australia | May 7, 1931 |